(12) United States Patent
Simons et al.

(10) Patent No.: US 11,828,395 B2
(45) Date of Patent: Nov. 28, 2023

(54) INLINE HOUSING FOR MAINTAINING A CABLE POSTURE

(71) Applicant: Imaging Brands, Inc., Phoenix, AZ (US)

(72) Inventors: Josh Simons, Phoenix, AZ (US); Michael Bargiel, Phoenix, AZ (US)

(73) Assignee: Imaging Brands, Inc.

( * ) Notice: Subject to any disclaimer, the term of this patent is extended or adjusted under 35 U.S.C. 154(b) by 118 days.

(21) Appl. No.: 17/671,170

(22) Filed: Feb. 14, 2022

(65) Prior Publication Data

US 2023/0258284 A1 Aug. 17, 2023

(51) Int. Cl.
*F16L 3/015* (2006.01)
*H02G 3/04* (2006.01)

(52) U.S. Cl.
CPC ............ *F16L 3/015* (2013.01); *H02G 3/0475* (2013.01); *H02G 3/0481* (2013.01); *H02G 3/0487* (2013.01)

(58) Field of Classification Search
CPC ..... F16L 3/015; H02G 3/0475; H02G 3/0481; H02G 3/0487
USPC ........................................................ 174/68.3
See application file for complete search history.

(56) References Cited

U.S. PATENT DOCUMENTS

| 5,215,338 | A | * | 6/1993 | Kimura | H02G 3/0475 403/114 |
| 7,644,957 | B2 | * | 1/2010 | Magno, Jr. | H02G 3/0468 285/236 |
| 7,741,563 | B2 | * | 6/2010 | Harada | H02G 3/0475 174/72 A |
| 8,445,782 | B2 | * | 5/2013 | Jaffari | F16L 25/01 174/84 R |
| 8,607,826 | B2 | * | 12/2013 | Krohn | F16L 57/02 138/155 |
| 2017/0343039 | A1 | * | 11/2017 | Keen | F16F 1/04 |
| 2018/0069386 | A1 | * | 3/2018 | Keen | H02G 11/00 |

* cited by examiner

*Primary Examiner* — Timothy J Thompson
*Assistant Examiner* — Michael F McAllister
(74) *Attorney, Agent, or Firm* — THOMAS W. GALVANI, P.C.; Thomas W. Galvani

(57) ABSTRACT

An in-line housing for maintaining a cable posture includes first and second barrels having first and second bores, respectively. The first and second barrels are mounted for movement with respect to each other into and out of a neutral arrangement. When the first and second barrels are arranged in the neutral arrangement, the first and second bores are coaxially registered with each other and enable rotational movement of a cable with respect to the housing when the cable is applied to the first and second barrels. When the first and second barrels are arranged out of the neutral arrangement, the first and second bores are skewed with respect to each other and disable rotational movement of the cable with respect to the housing when the cable is applied to the first and second barrels.

32 Claims, 17 Drawing Sheets

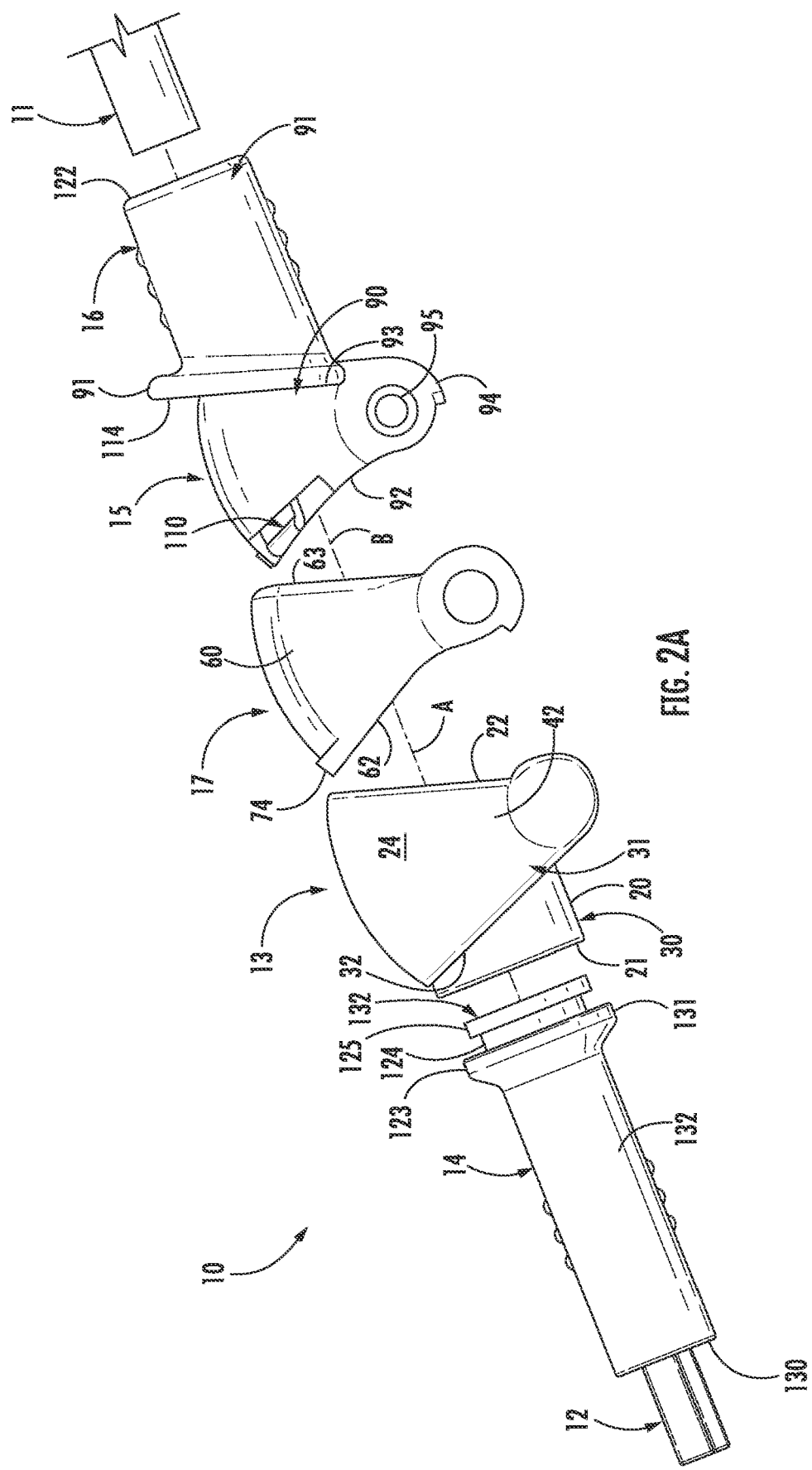

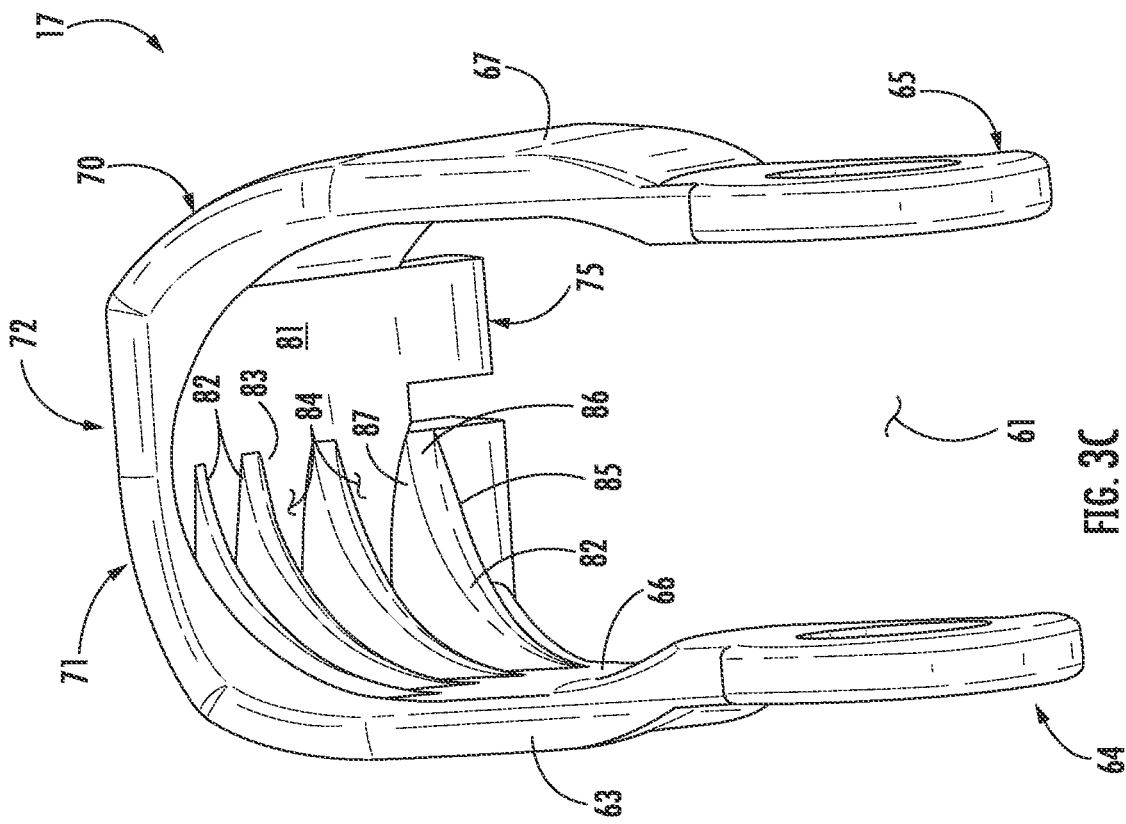
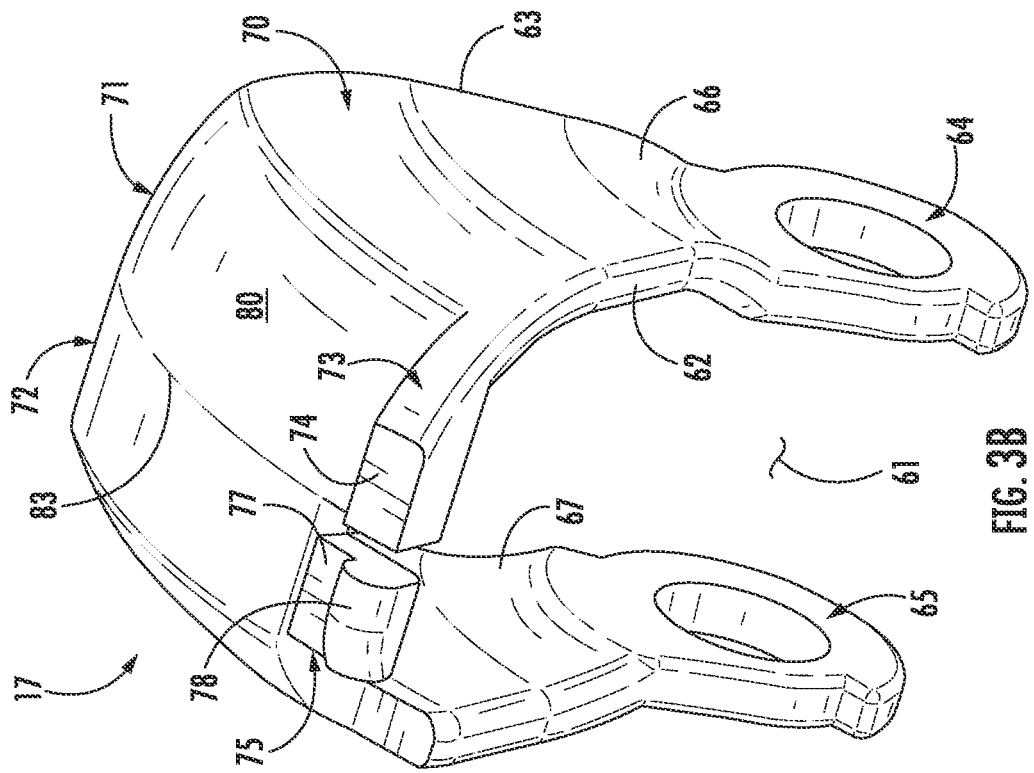

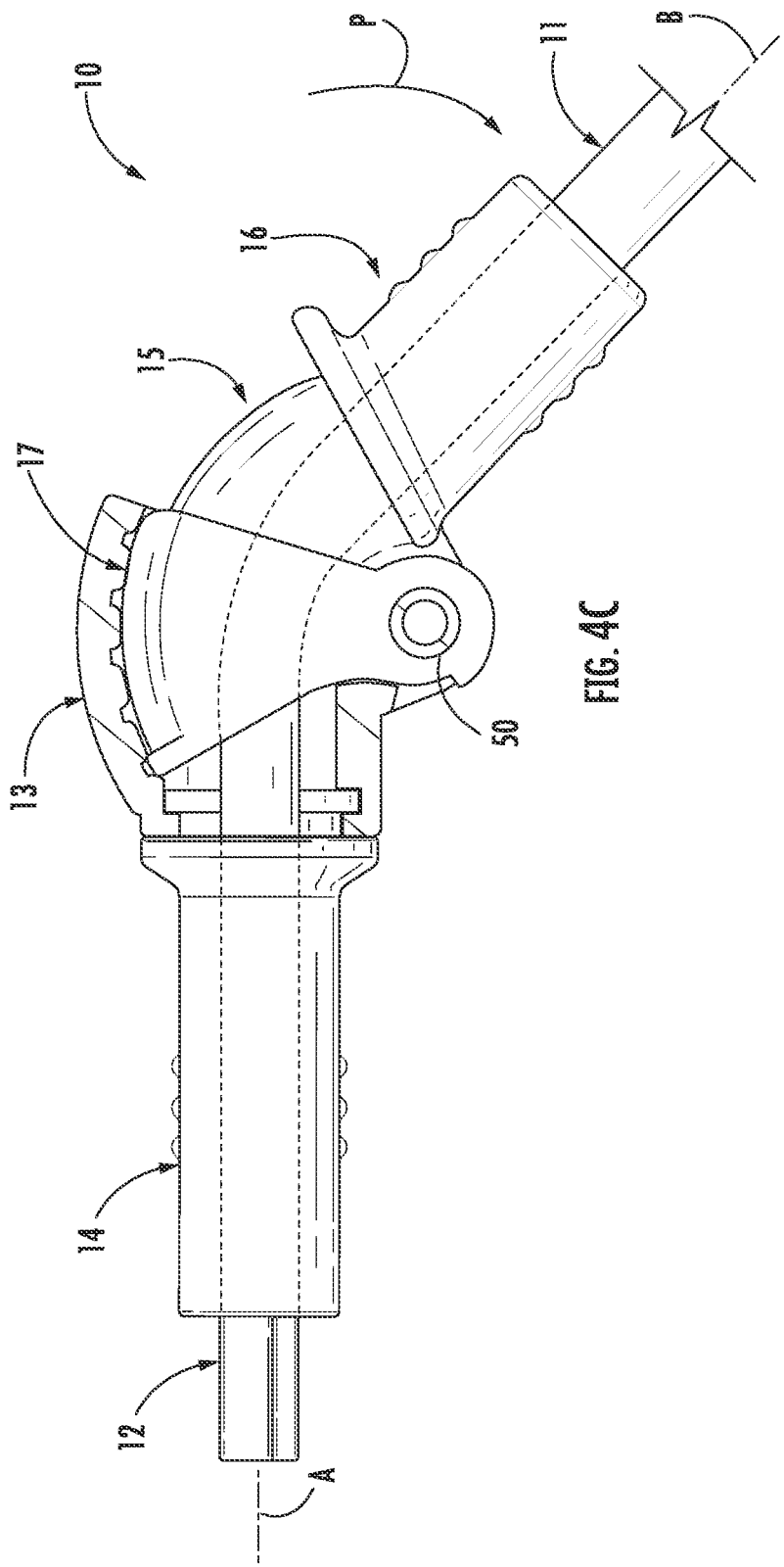

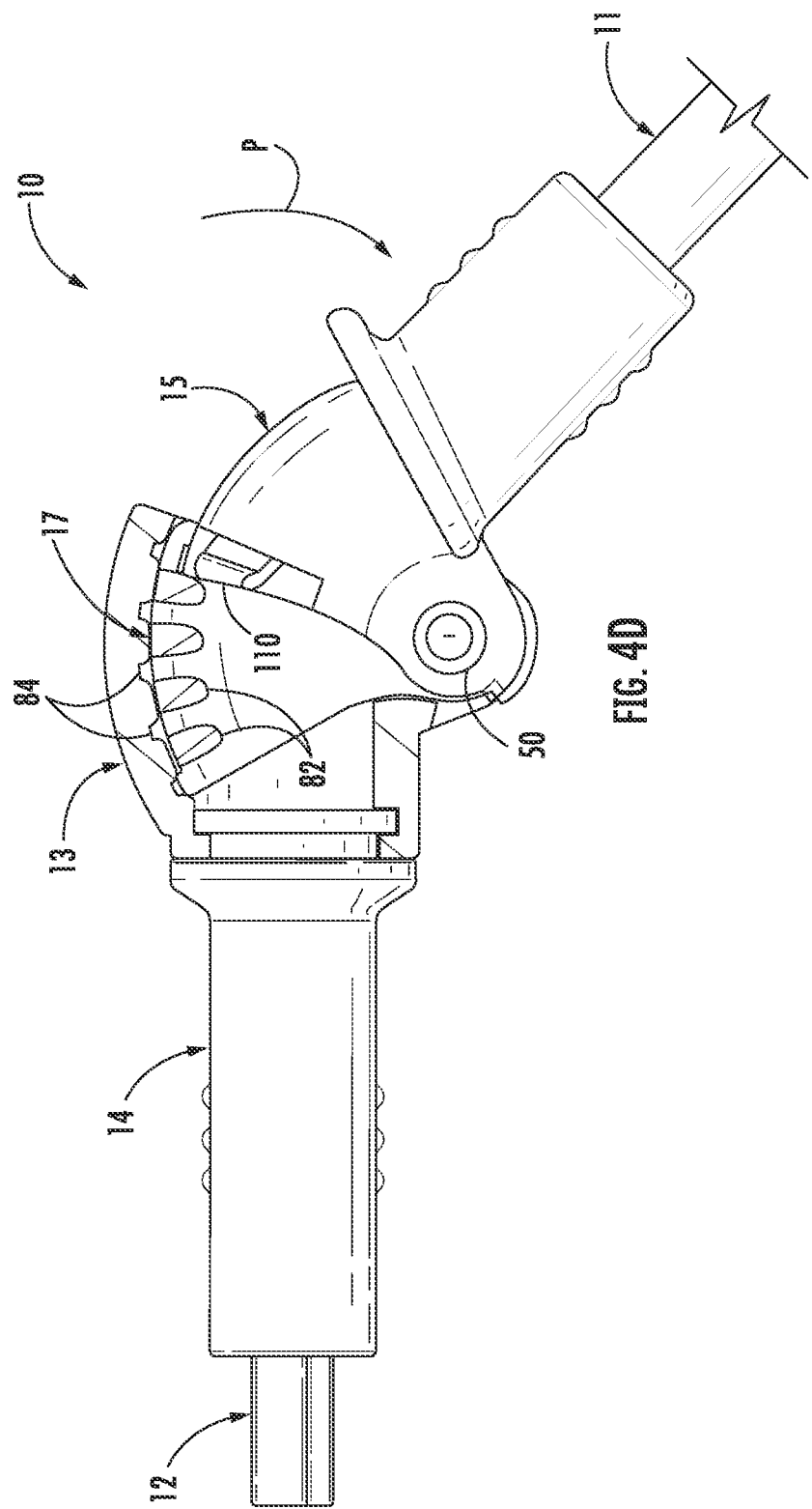

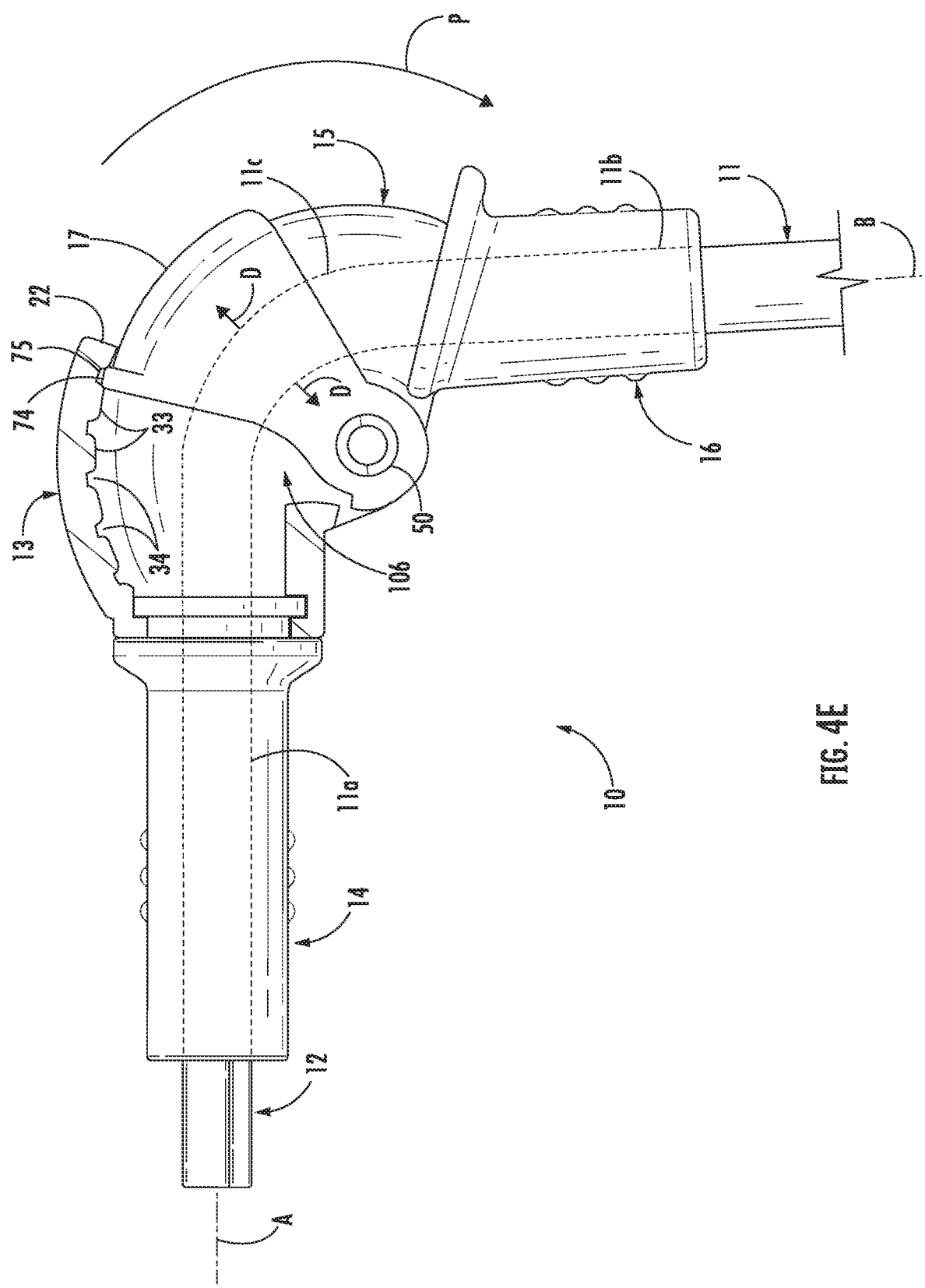

INLINE HOUSING FOR MAINTAINING A CABLE POSTURE

FIELD

The present specification relates generally to electronics, and more particularly to electronic cables.

BACKGROUND

Electronic cables carry electricity and data signals between two places. Those places are often not fixed or connected by a straight line. As such, electronic cables must be flexible so that a user can route them or move the items they connect.

Most data cables have a conventional construction in which a metallic data communication component is inside the cable and is covered by a flexible jacket on the outside of the cable. For example, telephone cables have an outer jacket encapsulating a twisted pair or several twisted pairs of cables. Each inner cable is metallic and jacketed and is twisted with a paired inner cable. Sometimes those twisted pairs are encapsulated within a single outer jacket, while other cables layer a metallic shield between the twisted pairs and the outer jacket. USB cables are similarly constructed in layers. USB cables have small-gauge wires at the center, each wrapped in a polyvinyl or like plastic jacket. A metallic foil wraps around the cluster of wires. A metallic braid typically encircles the foil. Finally, an outer jacket encapsulates the entire construction.

Layered-construction cables such as these deliver good electronic performance characteristics. They are effective at delivering data, blocking ingress noise which might impact that data, and reducing egress noise which can affect other nearby electronic components. They also have decent mechanical performance characteristics. They are generally flexible and able to perform even when tightly radiused or bent. Regardless, all cables have a minimum bend radius, which is a certain radius beyond which a cable cannot be bent without damaging it. Different inner construction techniques and different types of outer jackets affects mechanical characteristics such as flexibility, resiliency, bend radius, and others.

However, nearly universally, most cables have a high level of resilience, usually as a matter of design preference. They can be bent cyclically hundreds or thousands of times and continue to return to their original or near original arrangement. In other words, most data cables do not maintain a bent shape, but have this because the engineers who designed them wanted them to be resilient.

In some instances, a user actually prefers not to have a resilient cable. Rather, a user would prefer that he can bend the cable and maintain that bend in the cable. Because cables have resiliency, however, the user is frequently frustrated. He may resort to tying a cable back, weighting it down, or taping it into a bend to force it to keep the posture he desires. A solution which maintains a desired cable posture is needed.

SUMMARY

In an embodiment, an in-line housing for maintaining a cable posture includes first and second barrels having first and second bores, respectively. The first and second barrels are mounted for movement with respect to each other into and out of a neutral arrangement. When the first and second barrels are arranged in the neutral arrangement, the first and second bores are coaxially registered with each other and enable rotational movement of a cable with respect to the housing when the cable is applied to the first and second barrels. When the first and second barrels are arranged out of the neutral arrangement, the first and second bores are skewed with respect to each other and disable rotational movement of the cable with respect to the housing when the cable is applied to the first and second barrels.

In embodiments, when the housing is arranged out of the neutral arrangement, the cable applied to the first and second barrels bears against each of the first and second barrels to disable rotational movement of the cable with respect to the housing. Detent elements releasably lock the first and second barrels with respect to each other, when the first and second barrels are in and out of the neutral arrangement. The first and second barrels move with respect to each other into and out of the neutral arrangement about a pivot axis. The pivot axis is transverse to a first longitudinal axis of the first barrel. The pivot axis is transverse to a second longitudinal axis of the second barrel. The housing further includes an outer shell mounted to the first barrel, an inner shell mounted to the second barrel, and an intermediate shell. When the first and second barrels are in the neutral arrangement, the intermediate shell nests within the outer shell, and the inner shell nests within the intermediate shell. The pivot axis is a common pivot for the inner, outer, and intermediate shells. The first barrel is mounted for rotation with respect to the outer shell.

In an embodiment, an in-line housing for maintaining a cable posture includes an outer shell, and a first barrel mounted to the outer shell, an inner shell, and a second barrel mounted to the inner shell, and an intermediate shell disposed between the first and inner shells. The first, second, and intermediate shells are mounted at a common pivot axis, enabling movement of the first and second barrels into and out of a neutral arrangement. When the first and second barrels are in the neutral arrangement, the first and second barrels are coaxially registered. When the first and second barrels are out of the neutral arrangement, the first and second barrels are skewed with respect to each other.

In embodiments, when the first and second barrels are in the neutral arrangement, the intermediate shell nests within the outer shell, and the inner shell nests within the intermediate shell. When the first and second barrels are in the neutral arrangement, the first and second barrels enable rotational movement of a cable with respect to the housing when the cable is applied to the first and second barrels. When the first and second barrels are arranged out of the neutral arrangement, the first and second bores disable rotational movement of the cable with respect to the housing when the cable is applied to the first and second barrels. The housing includes detents which releasably lock the first and second barrels with respect to each other to prevent inadvertent movement into and out of the neutral arrangement. The first and second barrels move with respect to each other into and out of a neutral arrangement about the pivot axis. The pivot axis is transverse to a first longitudinal axis of the first barrel. The pivot axis is transverse to a second longitudinal axis of the second barrel. The first barrel is mounted for rotation with respect to the outer shell.

In an embodiment, an in-line housing for maintaining a cable posture includes an outer shell, and a first barrel mounted to the outer shell, an inner shell, and a second barrel mounted to the inner shell, and a common pivot axis for the first and inner shells, about which the first and second barrels move into and out of a neutral arrangement. When the first and second barrels are in the neutral arrangement, the first and second barrels are coaxially registered. When the first and second barrels are out of the neutral arrangement, the first and second barrels are skewed with respect to each other.

In embodiments, the housing includes detents which releasably lock the first and second barrels with respect to each other to prevent inadvertent movement into and out of the neutral arrangement. The pivot axis is transverse to a first longitudinal axis of the first barrel. The pivot axis is transverse to a second longitudinal axis of the second barrel. When the first and second barrels are in the neutral arrangement, the first and second bores enable rotational movement of a cable with respect to the housing when the cable is applied to the first and second barrels. When the first and second barrels are arranged out of the neutral arrangement, the first and second bores disable rotational movement of the cable with respect to the housing when the cable is applied to the first and second barrels. When the first and second barrels are in the neutral arrangement, the intermediate shell nests within the outer shell, and the inner shell nests within the intermediate shell. The first barrel is mounted for rotation with respect to the outer shell.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings:

FIGS. 2A, 2B, and 2C are left side, top, and right side exploded views of the inline housing showing a first or front barrel, an outer shell, an intermediate shell, an inner shell with a second or rear barrel, and a cable;

FIGS. 3B and 3C are isolated top front and bottom rear perspective views of the intermediate shell;

FIGS. 4A-4E are partially-eroded left side views of the housing in various arrangements moving from a neutral arrangement to one embodiment of a skewed arrangement.

DETAILED DESCRIPTION

Figure 1:
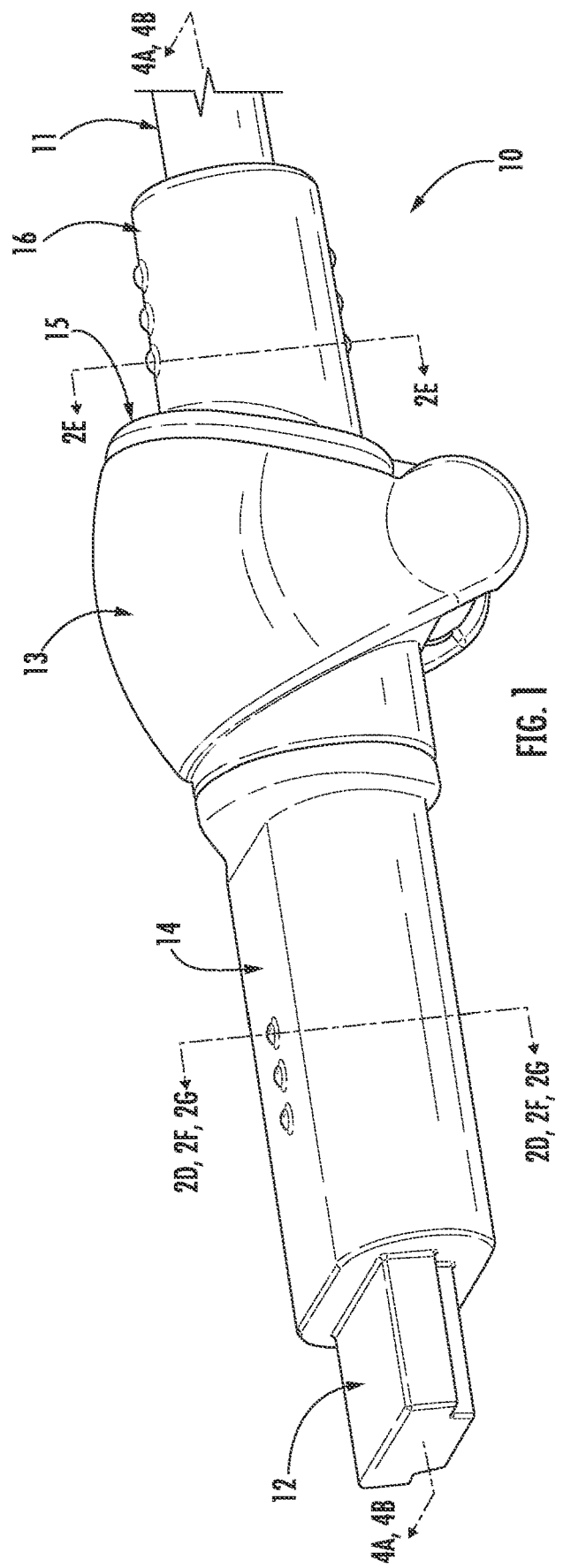
FIG. 1 is a side perspective view of an inline housing for maintaining a posture of a cable.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

Figure 4A:
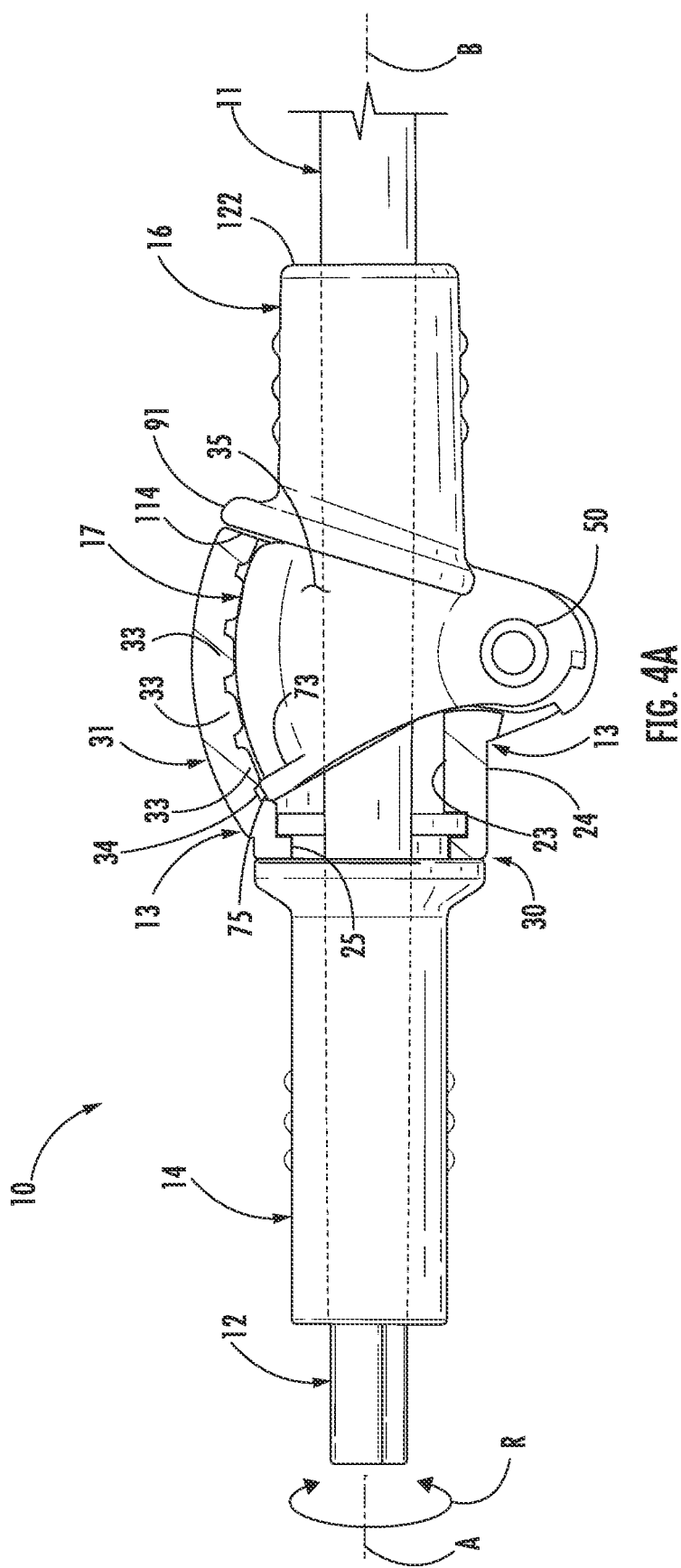
Figure 4B:
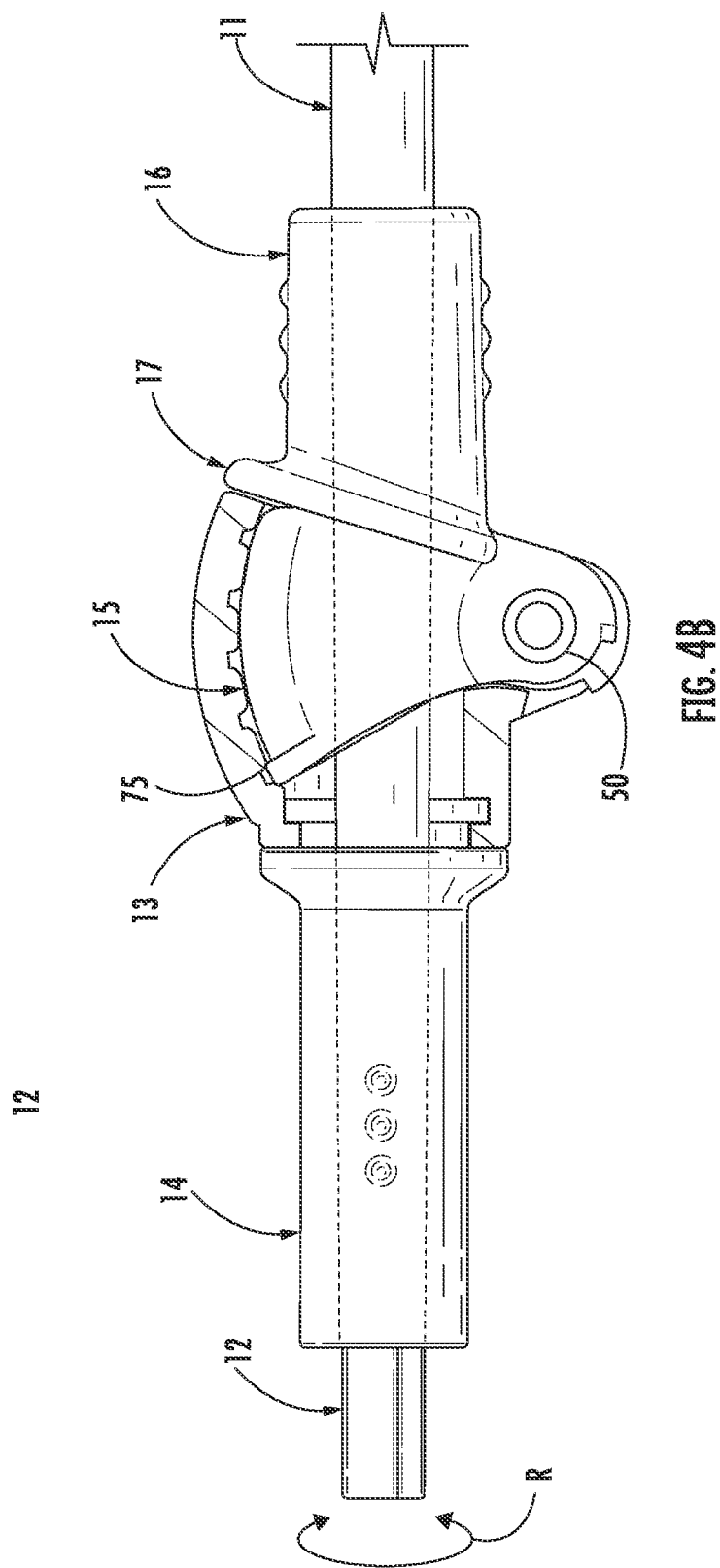

FIG. 1 illustrates an inline housing 10 for maintaining a posture for a cable 11 applied thereto. The housing 10 shown here has an integral connector 12 projecting from a front of the housing 10 such that the housing 10 is preferably formed as an integral part of the cable 11 during construction thereof. However, in other embodiments, the housing 10 is applicable to a preexisting cable 11 with a connector 12 separate from the housing 10. In either embodiment, the housing 10 is effective at maintaining a posture of the cable 11 as desired and set by the user, either proximate to or away from the connector 12. Posture includes both a relative rotational direction of the connector 12 and a bend in the cable 11 of a desired radius between zero degrees and over ninety degrees, from one portion of the cable 11 on one side of the housing 10 to another portion of the cable 11 on an opposing side of the housing 10. For example only, and without limitation, FIGS. 1 and 4A show a neutral posture or neutral arrangement of the housing 10, in which the connector 12 in front of the housing 10 has a first rotational position and is coaxially registered with the cable 11 behind the housing 10 ("front" identifies a direction toward the connector 12). In FIG. 4E, however, the cable 11 is bent such that the connector 12 is transverse to or skewed with respect to the cable 11 behind the housing 10, though the connector 12 maintains its first rotational position relative the FIGS. 1 and 4A. In FIG. 4B, the connector 12 adopts a second rotational position which is approximately offset by ninety degrees with respect to the first rotational position of FIG. 1. Other postures are possible, of course, and are included within the scope of this disclosure, as is made clear throughout the below description.

With reference to FIG. 1 and FIG. 2A primarily, the housing 10 includes a first or outer shell 13 to which a first or front barrel 14 is mounted for rotation. The housing 10 includes a second or inner shell 15 to which a second or rear barrel 16 is integrally formed. The housing 10 further includes an intermediate shell 17 disposed between the outer and inner shells 13 and 15. The outer, inner, and intermediate shells 13, 15, and 17 pivot about a common pivot point to nest within each other and thereby move the housing 10 into and out of the neutral arrangement shown in FIG. 1. The shells further lock into each other to maintain the desired arrangement, and to enable or disable rotation, or the cable 11.

Figure 2B:
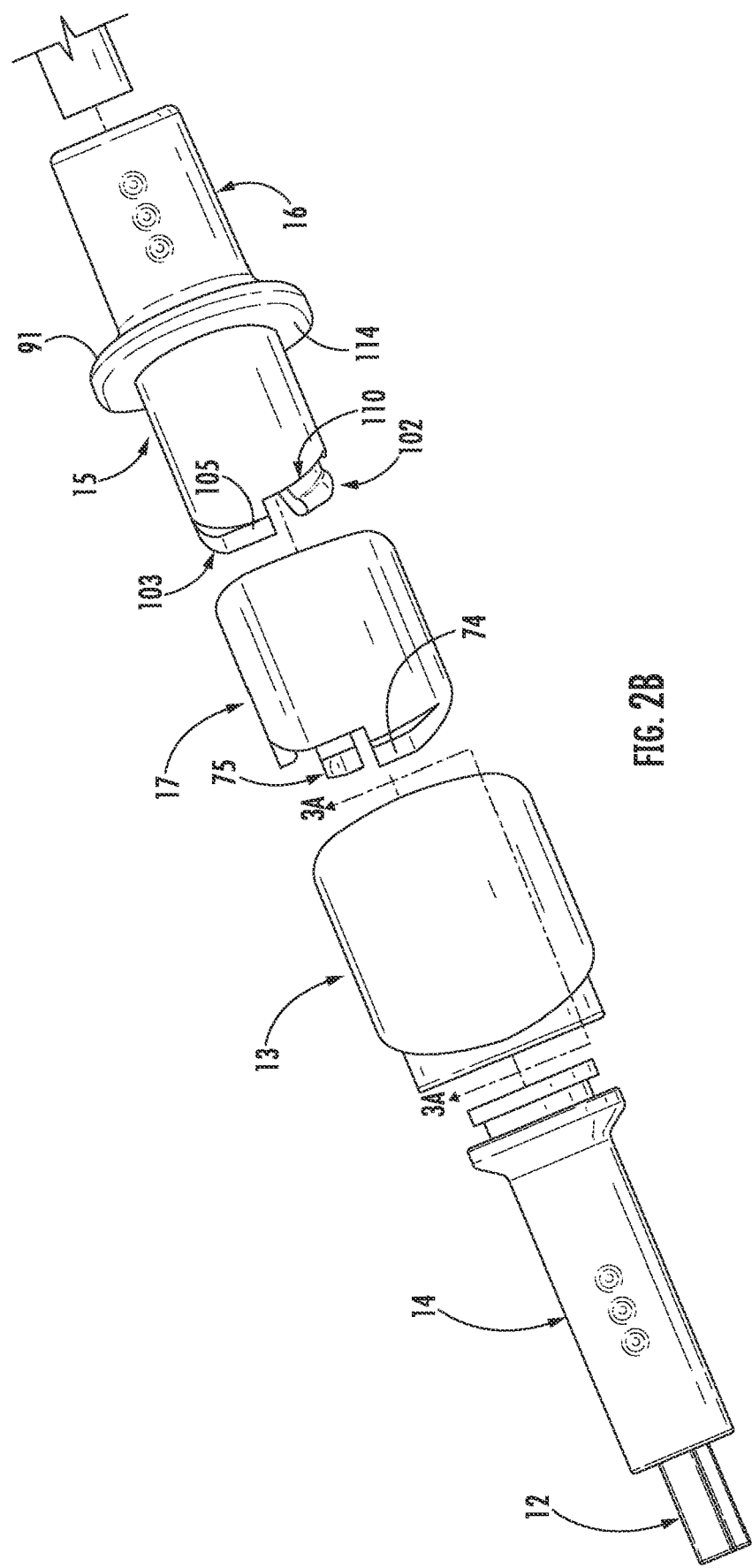
Figure 3A:
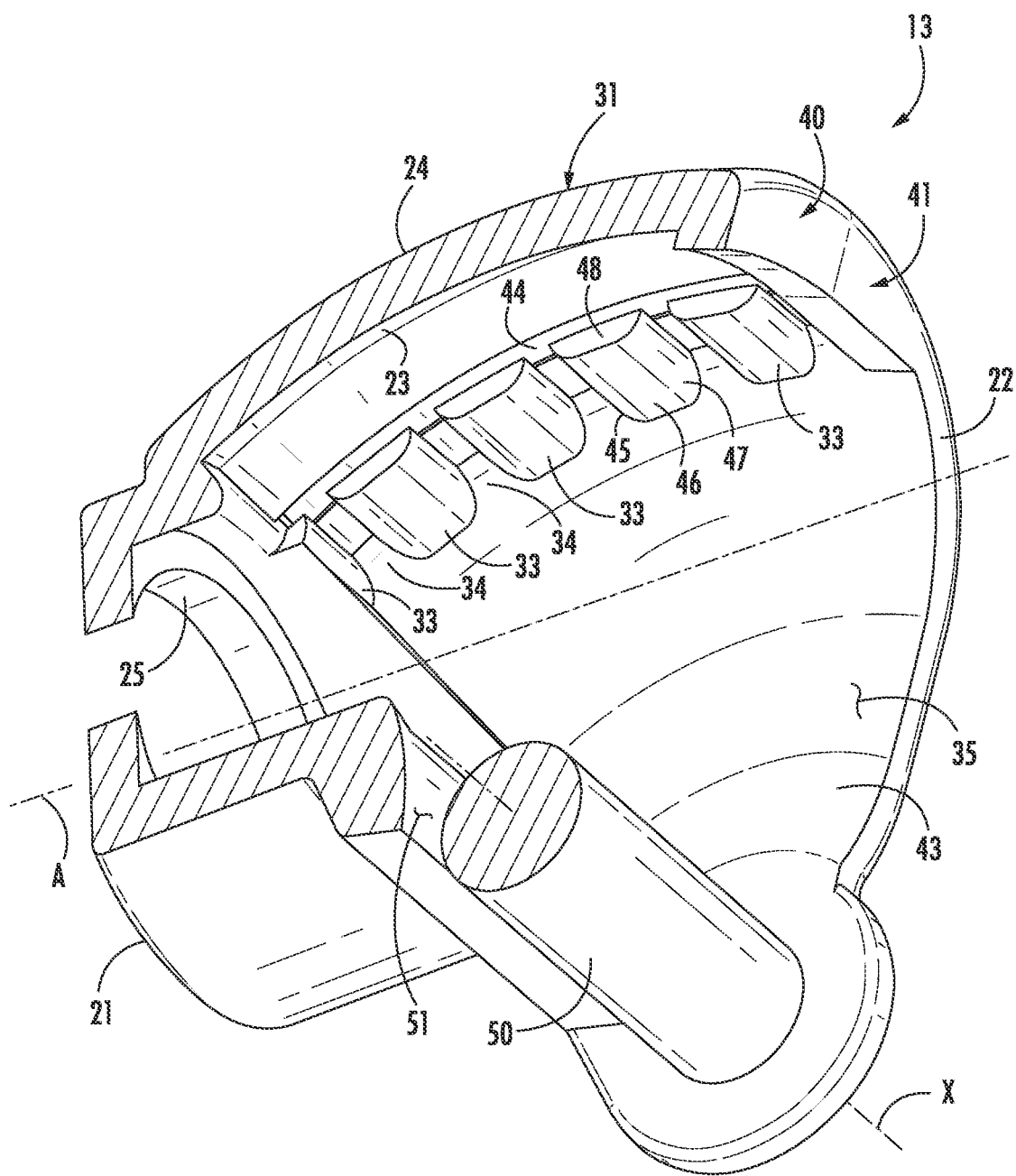
FIG. 3A is an isolated, lower perspective, partial section view of the outer shell, taken along the line 3-3 from FIG. 2B.

Referring now also to FIG. 3A, which is a partial section view taken through the outer shell 13, in isolation, along the line 3-3 from FIG. 2B, the outer shell 13 is formed from a single sidewall 20 which very roughly has a cylindrical shape. The sidewall 20 surrounds and is registered longitudinally with a longitudinal axis A, shown in FIG. 2A as extending longitudinally through the entire housing 10. Along the axis A, the sidewall 20 has a front end 21 and an opposed rear end 22. The front end 21 is an edge which is normal or perpendicular to the axis A, while the rear end 22 is an edge which is not necessarily normal to the axis A. A radially-inwardly-directed lip 25 extends inward to define a narrow-diameter front mouth of the outer shell 13. In the embodiment shown in FIG. 2A, opposite this mouth, the rear end 22 is not normal to the axis A, but in other embodiments it is.

The outer shell 13 has a base 30, which is a quasi-cylindrically-shaped portion of the sidewall 20 proximate the front end 21. The base 30 is coaxially registered with the axis A. The base 30 is quasi-cylindrical because it is an obliquely-truncated cylinder: the front end 21 defines an end of the base 30 which is normal to the axis A, and the base 30 extends rearward to terminate at a transition 32 along a canopy 31. The transition 32 is shown as an edge in FIG. 2A, but lies along a plane which is oblique with respect to the axis A, though in other embodiments the transition 32 may be normal to the axis A. This renders the quasi-cylindrical base 30 as obliquely-truncated. In other embodiments, the base 30 is cylindrical or has other shapes.

The base 30 extends from the front end 21 rearward to the canopy 31. As best shown in FIG. 2A, the canopy 31 enlarges or billows out from the base 30. The canopy 31 begins at the transition 32 and extends to an opposed rear end defined by the rear end 22 of the outer shell 13. Between the transition 32 and the rear end 22, the canopy 31 is convex. The canopy 31 covers or bounds an outer receiving space 35.

The sidewall 20 has an inner surface 23 and an opposed outer surface 24. The outer surface 24 is relatively smooth, lacking projections, depressions, or other surface ornamentation, though in some embodiments the outer surface 24 is knurled, textured, or otherwise marked.

The inner surface 23 generally follows the contour of the outer surface 24 across the canopy 31. However, the inner surface 23 is asymmetric about a vertical plane which includes the longitudinal axis A. A set of ribs 33 principally defines this asymmetry. As can be seen in FIG. 3A, the outer shell 13 has a left half 40 and an opposed, slightly different right half 41. The halves 40 and 41 are integrally and monolithically formed to each other, such that the outer shell 13 is a single and solid unitary piece. The inner surface 23 is smooth along the left half 40 of the canopy 31 but is interrupted along the right half 41 of the canopy by the ribs 33. The ribs 33 are short, straight, roughly semi-circular, and project inward into the receiving space 35, spanning from a right wall 43 (opposite a left wall 42) inward centrally to a crown 44 along the canopy 31. Channels 34 are disposed between the ribs 33, thereby defining detent elements between the ribs 33 in which a finger on the intermediate shell 17 releasably locks. Both the ribs 33 and the channels 34 extend transverse to the longitudinal axis A. The intermediate shell 17 nests within the outer shell 13 and engages with these alternating ribs 33 and channels 34. The rear end 22 has a slight radially-inwardly-directed lip at the crown 44, which acts as a confrontation surface with the intermediate shell 17 to prevent the outer and intermediate shells 13 and 17 from separating during movement.

The ribs 33 are identical in structure. Each has a rounded front face 45, a flat apex 46, and a rounded rear face 47. The front face 45 is directed toward the front end 21; it slopes from the inner surface 23 to the apex 46 in a convex fashion. The apex 46 is relatively flat along the width of the rib 33, roughly parallel to the longitudinal axis A. The rear face 47 slopes back down from the apex 46 to the inner surface 23, approximately at an angle and curve opposite that of the front face 45. The ribs 33 terminate at blunt ends 48 just inboard of the crown 44 of the canopy 31.

Below the canopy 31, just behind the base 30 and the transition 32, a post 50 projects laterally between the left and right walls 42 and 43, transverse to the axis A. The post 50 is cylindrical. It is spaced apart from the transition 32 by a small gap 51. The post 50 is a common pivot axis for the outer shell 13 and the front barrel 14 mounted to it, the inner shell 15 and the rear barrel 16 mounted to it, and the intermediate shell 17.

The intermediate shell 17 nests within the outer receiving space 35 of the outer shell 13. With reference to FIGS. 2A, 3B, and 3C, the intermediate shell 17 is formed from a single sidewall 60. The sidewall 60 surrounds an inner receiving space 61 which receives the inner shell 15 in a nesting arrangement. The intermediate shell 17 has a front end 62 and an opposed rear end 63. Both the front and rear ends 62 and 63 are edges which are generally flat or straight and which extend upward from opposed left and right rings 64 and 65. The rear end 63 has a slight inward lip which acts as a confrontation surface to the inner shell 15 to prevent separation of the intermediate and inner shells 17 and 15 during movement. The rings 64 and 65 are fit over the post 50 on the outer shell 13 such that the intermediate shell 17 is mounted for pivotal movement with respect to the outer shell 13. Left and right walls 66 and 67 extend upward from the rings 64 and 65. The left and right walls 66 and 67 extend to a canopy 70.

The canopy 70, together with the left and right walls 66 and 67, bounds the inner receiving space 61. The canopy 70 is convex over the inner receiving space 61, begins at the front end 62, and extends rearwardly entirely to the rear end 63.

Similarly to the outer shell 13, the intermediate shell 17 has a left half 71 and an opposed, slightly different, right half 72. The halves 71 and 72 are integrally and monolithically formed to each other, such that the intermediate shell 17 is a single and solid unitary piece. A lip 73 projects upwardly at the front end 62 of the intermediate shell 17 on the left half 71. The lip 73 spaces the intermediate shell 17 apart from the outer shell 13. More precisely, the lip 73 spaces the intermediate shell 17 within the outer shell 13 and guides pivotal movement about the common pivot axis of the post 50, such that the intermediate shell 17 maintains a defined spacing from the outer shell 13. The lip 73 includes a flat bearing surface 74 which slides along the smooth inner surface 23 of the left half 40 of the outer shell 13.

While the lip 73 maintains radial spacing of the intermediate shell 17 within the outer shell 13 during pivotal movement, the intermediate shell 17 includes a finger 75 which indexes the pivotal movement of the intermediate shell 17. The finger 75 projects forwardly in a notch 76 set back from the front end 62. The finger 75 includes an arm 77 formed to the canopy 70 and extending forwardly therefrom, and an enlarged head 78 projecting upwardly from the canopy 70. The finger 75 is spaced apart circumferentially from the lip 73, and the enlarged head 78 is approximately level with the bearing surface 74.

The finger 75 snaps into and out of the channels 34 defined between the ribs 33 on the underside of the outer shell 13. As the intermediate shell 17 pivots within the outer receiving space 35 of the outer shell 13, the finger 75 moves over each rib 33 and into each channel 34, thereby snap-engaging into each channel 34 to index the intermediate shell 17 with respect to the outer shell 13. A force must be applied against the intermediate shell 17 to bias the finger 75 out of the channel 34 and move over an adjacent rib 33, thereby preventing accidental movement out of the indexed position in a channel 84. Moreover, the lip 73, bearing against the smooth inner surface 23 of the outer shell 13, maintains radial spacing between the outer shell 13 and the intermediate shell 17 such that the finger 75 maintains a pre-determined tension or spring force when it snaps over each rib 33.

The intermediate shell 17 has a relatively smooth outer surface 80 and an opposed inner surface 81 which includes surface features. The inner surface 81 generally follows the contour of the canopy 70. However, the inner surface 81, like the canopy 70 itself, is asymmetric about a vertical plane bisecting the left and right halves 71 and 72. A set of ribs 82 on the underside of the canopy 70 principally defines this asymmetry. As can be seen in FIG. 3C, the inner surface 81 is smooth along the right half 72 but is interrupted along the left half 71 by a series of spaced-apart ribs 82. The ribs 82 project arcuately from the left wall 66 upward and inward centrally to a crown 83 along the canopy 70. Channels 84 are disposed between the ribs 82, thereby defining detent elements between the ribs 82 to which a finger on the inner shell 15 releasably locks. Both the ribs 82 and the channels 84 extend transversely across the canopy 70. When the inner shell 15 nests within the inner receiving space 61, these ribs 82 and channels 84 engage with a finger on the inner shell 15.

The ribs 82 are identical in structure. Each has a sloping front face 85, a flat apex 86, and a sloping rear face 87. The front face 85 is directed toward the front end 62; it slopes from the inner surface 81 to the apex 86. The apex 86 is relatively flat along the arc of the rib 82. The rear face 87 slopes back down from the apex 86 to the inner surface 81, approximately at an angle and contour opposite that of the front face 85. Between the left wall 66 and the crown 83, each rib 82 spans approximately a quarter-circle arc.

Just as the intermediate shell 17 nests within the outer shell 13, so, too, does the inner shell 15 nest within the intermediate shell 17. Specifically, the inner receiving space 61 receives the inner shell 15.

With reference to FIGS. 2A-2C and FIG. 3D, the inner shell 15 includes a canopy 90 and the rear barrel 16 formed integrally and monolithically to the canopy 90. A collar 91 projects radially outward between the canopy 90 and the rear barrel 16. Both the canopy 90 and barrel 16 surround and are registered longitudinally with a longitudinal axis B. In the posture shown in FIG. 2A, axes A and B are registered with each other, and both are transverse with respect to the post 50.

The canopy 90 has a front end 92 and an opposed rear end 93. Both the front and rear ends 92 and 93 are transverse to the axis B, though they are oriented in opposite directions with respect to each other. The canopy 90 extends upward from a cylindrical hub 94. The hub 94 has a central bore 95 which is perpendicular to the axis B. The bore 95 receives the post 50 of the outer shell 13, and the rings 64 and 65 are mounted over the post 50 just outside the bore 95 and within the left and right walls 42 and 43 of the outer shell 13. The inner shell 15 is thus mounted for pivotal movement with respect to both the outer shell 13 and the intermediate shell 17.

The canopy 90 projects upwardly from the hub 94, such that it enlarges or billows out from the hub 94. Between the front and rear ends 92 and 93, the canopy 90 is convex. The canopy 90 bounds a bore 96 aligned with the axis B. The bore 96 is straight and cylindrical, and extends not only through the canopy 90 but continues straight through the rear barrel 16. The bore 96 is thus suitable for receiving the cable 11, as shown in FIG. 2A. The inner shell 15 has an inner surface 100 and an opposed outer surface 101. The inner surface 100 is relatively smooth, lacking projections, depressions, or other surface ornamentation. The inner surface 100 thus smoothly receives the cable 11 and allows the cable 11 to slide, turn, and move within the bore 96 without inhibition. Allowing the cable 11 to slide, turn, and move prevents the imposition of strain, compression, and kinks on the cable 11, thereby increasing the reliability of the cable 11, thereby increasing the performance life of the cable 11.

Figure 3D:
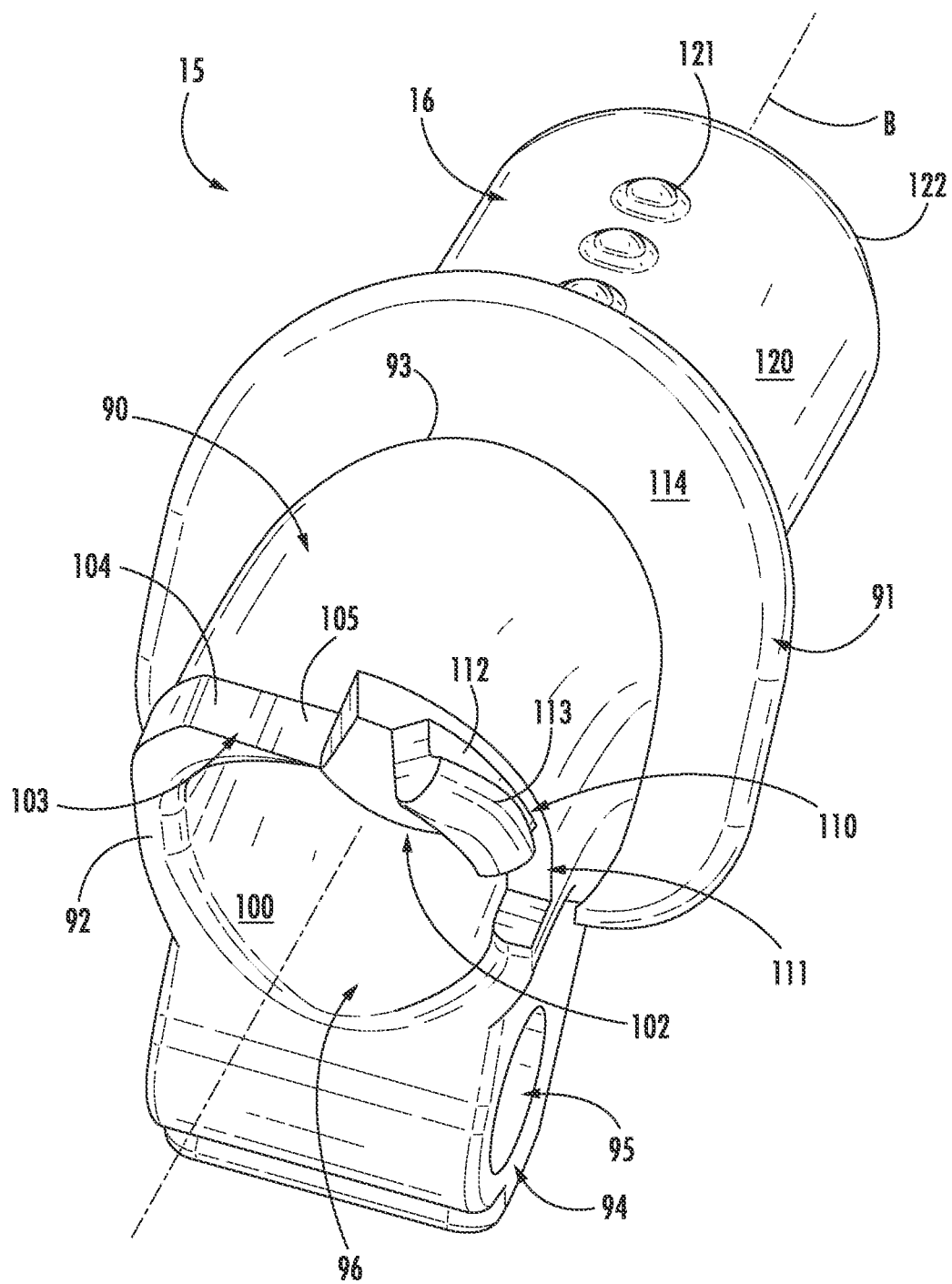
FIG. 3D is an isolated front perspective view of the inner shell.

Referring primarily now to FIG. 2B and FIG. 3D, the inner shell 15 has a left half 102 and an opposed, slightly different, right half 103. The halves 102 and 103 are integrally and monolithically formed to each other, such that the inner shell 15 is a single and solid unitary piece. A lip 104 projects upwardly at the front end 92 of the inner shell 15 on the right half 103. The lip 104 properly spaces the inner shell 15 radially within the intermediate shell 17 and guides pivotal movement about the common pivot axis of the post 50, such that the inner shell 15 maintains a defined radial spacing from the intermediate shell 17. The lip 104 includes a flat bearing surface 105 which slides along the smooth inner surface 81 of the right half 72 of the intermediate shell 17.

While the lip 104 maintains spacing within the intermediate shell 17 during pivotal movement, the inner shell 15 includes a finger 110 which indexes the pivotal movement of the inner shell 15. The finger 110 projects forwardly from a notch 111 set back from the front end 92. The finger 110 includes an arm 112 formed to the canopy 90 and extending forwardly therefrom and an enlarged head 113 projecting upwardly from the canopy 90. The finger 110 is spaced apart circumferentially from the lip 104, and the enlarged head 113 is approximately level with the bearing surface 105. The enlarged head 113 is directed radially outward away from the longitudinal axis B such that it projects up in the direction of the bearing surface 105 but also laterally away from the bearing surface 105. This orientation better aligns the finger 110 to engage with the ribs 82 on the underside of the intermediate shell 17.

The finger 110 snaps into and out of the channels 84 defined between the ribs 82 on the inner surface 81 of the intermediate shell 17. As the inner shell 15 pivots, the finger 110 moves over each rib 82 and into each channel 84, thereby snap-engaging into each channel 84 to index the inner shell 15 with respect to the intermediate shell 17. A force must be applied against the inner shell 15 to bias the finger 110 out of the cannel 84 and move over an adjacent rib 82, thereby preventing accidental movement of the inner shell 15 out of any of the indexed positions in one of the channels 84. Moreover, the lip 104, bearing against the smooth inner surface 81 of the intermediate shell 17, maintains radial spacing between the intermediate shell 17 and the inner shell 15 such that the finger 110 maintains a pre-determined tension or spring force when it snaps over each rib 82.

Behind the canopy 90 is the collar 91, formed at the rear end 93 of the canopy 90. The collar 91 is a large, radially-projecting flange extending contiguously from the rear end 93. It is oblique with respect to the longitudinal axis B and parallel to the rear ends 22 and 63 of the outer and intermediate shells 13 and 17, respectively. The collar 91 presents a flat, quasi-annular confrontation surface 114 toward the front of the inner shell 15. The confrontation surface 114 is a stop for both the outer and intermediate shells 13 and 17 when the shells 13, 15, and 17 are fully nested.

The rear barrel 16 projects rearwardly from the collar 91. In this embodiment, the rear barrel 16 is cylindrical and bounds and defines the bore 96 in cooperation with the canopy 90; in other embodiments, the rear barrel 16 has other shapes and configurations. The rear barrel 16 has an inner surface which is smooth and an uninterrupted continuation of the inner surface 100 of the canopy. The rear barrel 16 has an outer surface 120 which is also generally smooth. In the embodiment shown in these drawings, small three protrusions 121 extend outward from the outer surface 120 both on both the top and bottom of the inner shell 15. In other embodiments, the outer surface 120 carries other features, or is knurled, textured, or otherwise marked. In the embodiment shown in FIGS. 3D and 2E, the inner surface 100 at the rear barrel 16 is cylindrical and corresponds to the outer dimension of the cable 11. In other embodiments, the inner surface 100 at the rear barrel 16 has other shapes and configurations. For example, in some embodiments, the inner surface 100 has a square cross-section, an oval cross-section, a U-shaped cross-section, or other shapes. The configuration of the inner surface 100 at the rear barrel 16 is not limited to those embodiments shown or described herein.

The rear barrel 16 terminates at a rear end 122. The rear end 122 is open, defining a mouth which is sized and shaped to receive the cable 11. In some embodiments, the inline housing 10 is slipped over a cable 11, while in other embodiments, the inline housing 10 is formed to the cable, generally at the front of the housing 10. Opposite the rear barrel 16 is the front barrel 14.

Figure 2C:
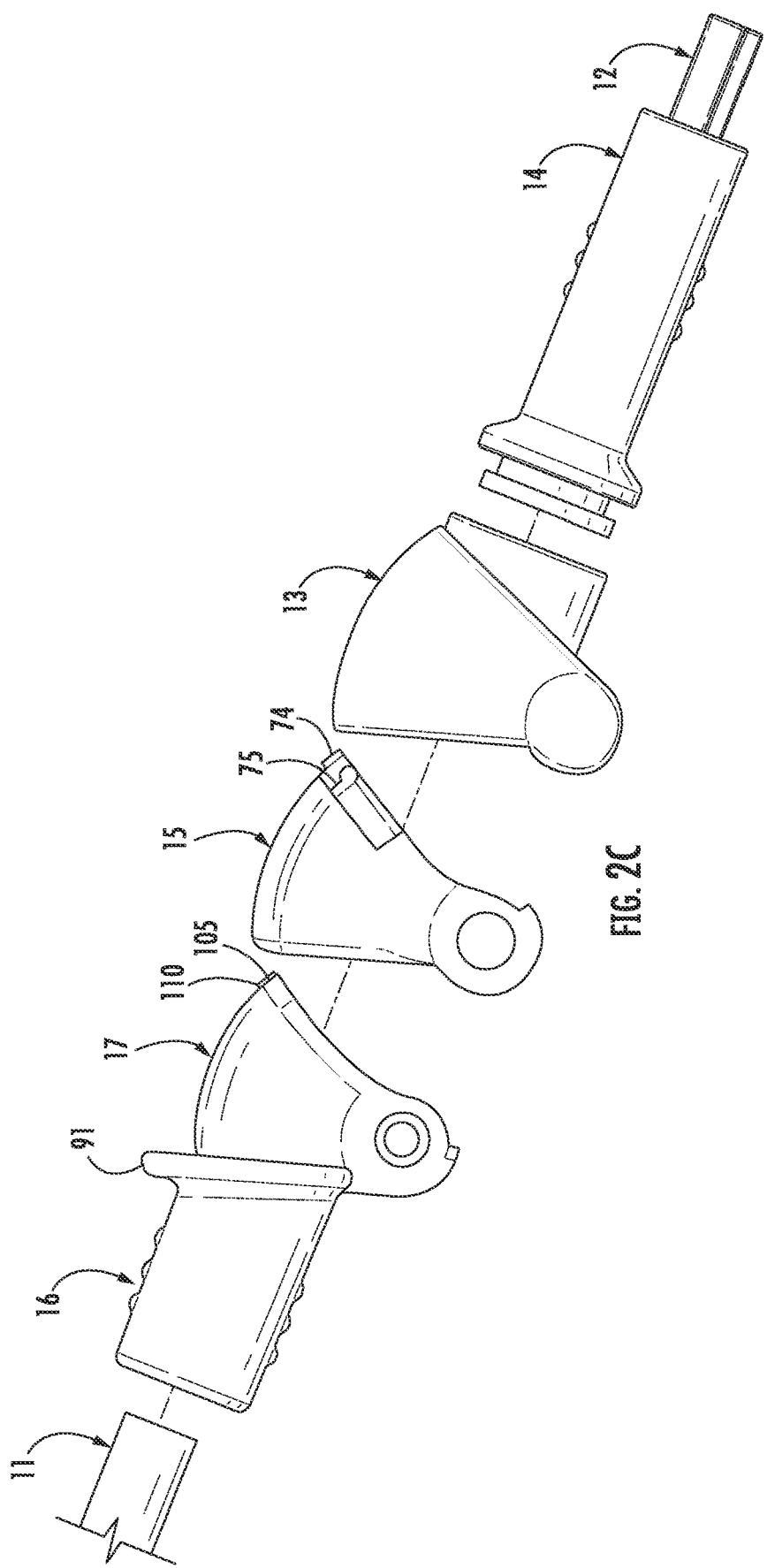
Figure 2D:
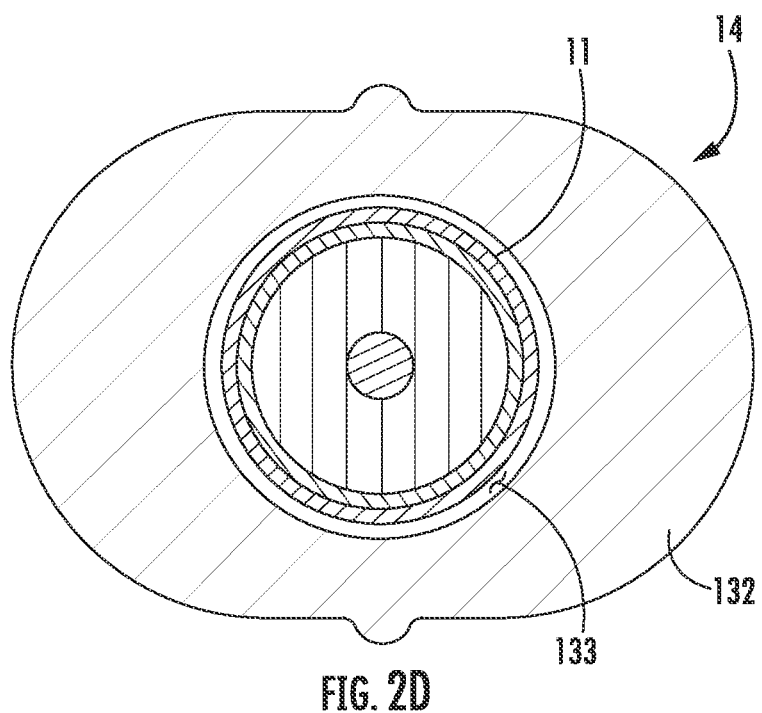
FIGS. 2D, 2E, 2F, and 2G are section views of the inline housing taken along the lines 2D-2D, 2E-2E, 2F-2F, and 2G-2G, respectively.
Figure 2E:
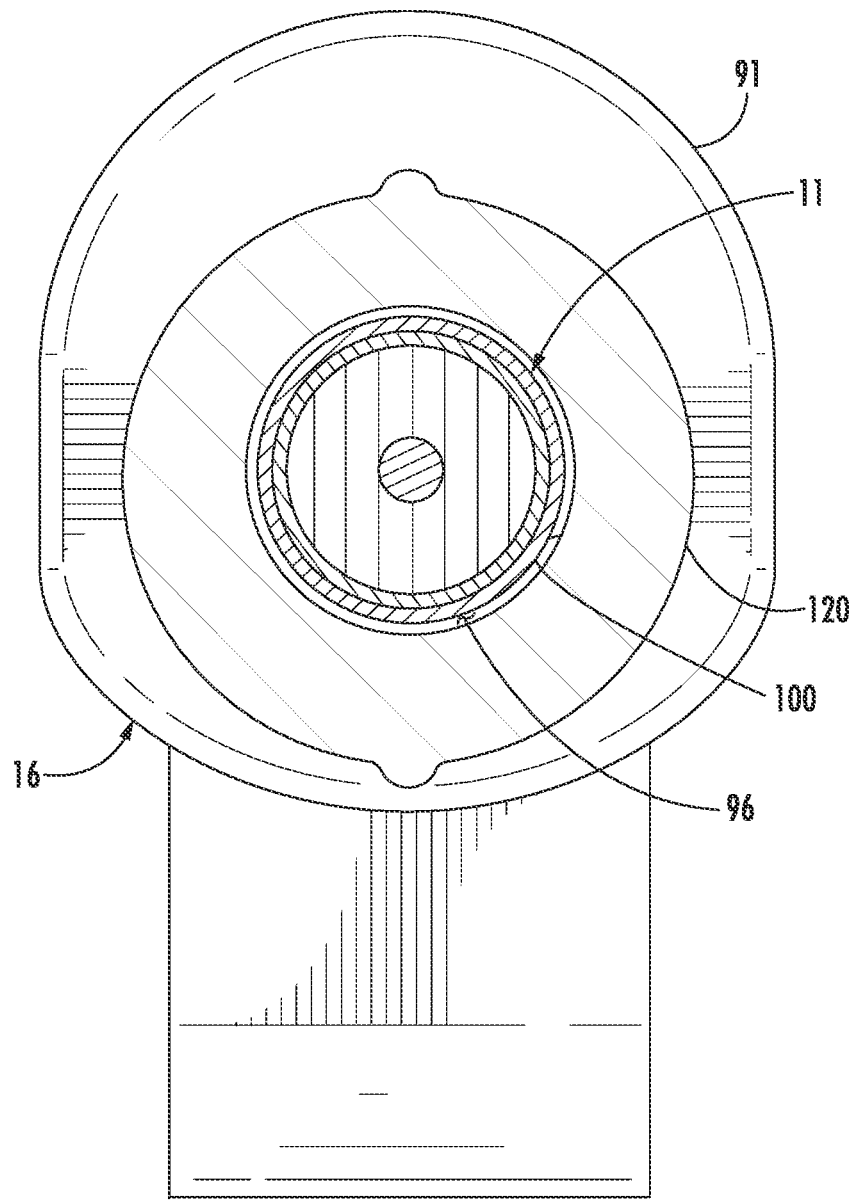
Figure 2F:
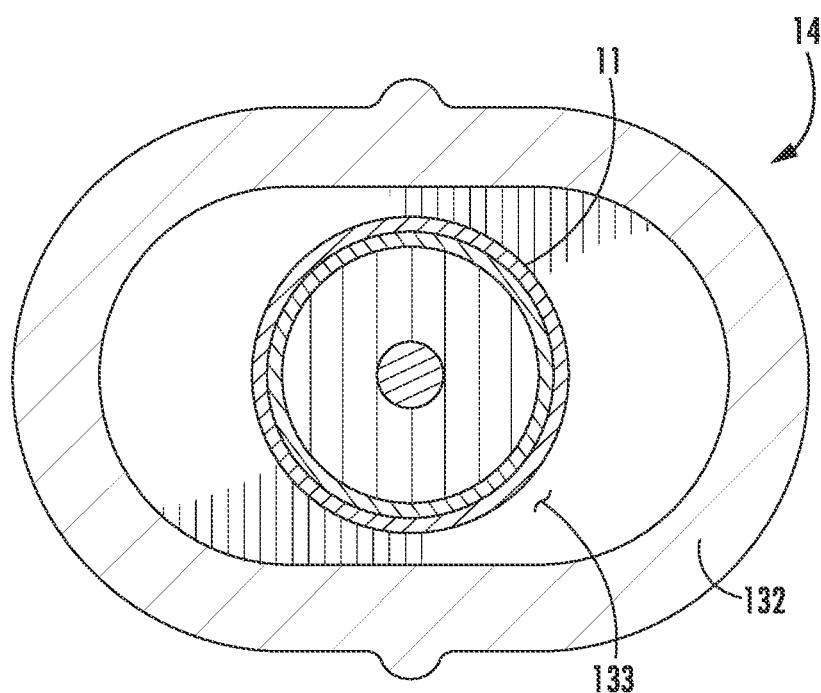
Figure 2G:
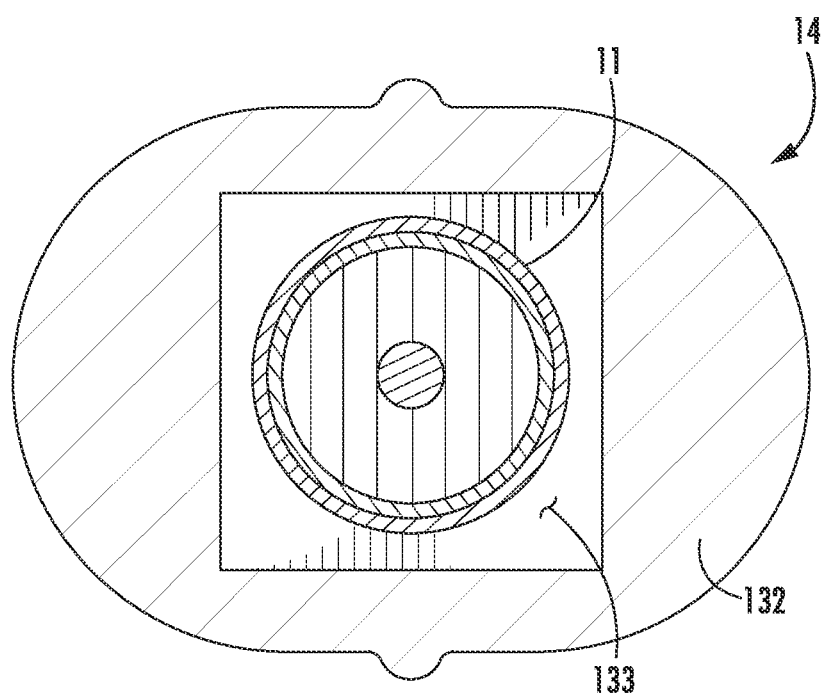

In the embodiment of the front barrel 14 shown in FIGS. 2A-2C and in the section view of FIG. 2D, the connector 12 is formed integrally and monolithically as a part of the front barrel 14. The front barrel 14 has a front end 130 and an opposed rear end 131. Between the front and rear ends 130 and 131, the front barrel 14 has a sidewall 132 bounding and defining an open, cylindrical bore 133. The sidewall 132 is cylindrical and aligned with the longitudinal axis A of the outer shell 13. The bore 133 is visible only in the section view of FIG. 2D and extends through the front barrel 14 coaxially with the cylindrical sidewall 132. In the embodiment shown in FIG. 2D, the bore 133 has a circular cross-section, corresponding to and closely receiving the outer dimension of the cable 11. In other embodiments, the sidewall 132 has other shapes and configurations. For example, in some embodiments, the sidewall 132 defines a bore 133 with a square cross-section, an oval cross-section, a U-shaped cross-section, or other shapes. FIG. 2F shows one such alternate embodiment, in which the sidewall 132 has an oval configuration for its cross-section, such that the cable 11 is not so closely received as in the circular cross-section. FIG. 2G shows another such alternate embodiment, in which the sidewall 132 has a square configuration for its cross-section, such that the cable 11 is not so closely received as in the circular cross-section. The configuration of the sidewall 132 is not limited to those embodiments shown or described herein. The sidewall 132 has a constant outer diameter along most of the length of the front barrel 14 between the front and rear ends 130 and 131, except proximate to the rear end 131, the sidewall 132 flares radially outward to define a flange 123. Behind the flange 123 is a short, cylindrical post 124 of a reduced diameter. The post 124 is coaxial to the flange 123. The post 124 extends rearwardly and terminates in a lip 125 projecting radially outward.

The post 124 and lip 125 engage the front barrel 14 to the outer shell 13. When engaged, the inwardly-directed lip 25 of the outer shell 13 is received in a close-fit arrangement over the post 124, and the outwardly-directed lip 125 is behind the lip 25. As such, the lip 25 of the outer shell 13 is disposed between the flange 123 and the lip 125, which prevents relative axial movement of the front barrel 14 and the outer shell 13 but allows relative rotational movement of the two. The front barrel 14 is thus mounted for rotational movement to the front end of the outer shell 13 and can rotate without limitation in both clockwise and counter-clockwise directions.

The connector 12 is fixed to the front end 130 of the front barrel 14. The front end 130 defines a mouth sized and shaped to receive the cable 11, and the connector 12 is molded, welded, or otherwise formed to it. In this embodiment, the connector 12 is integrally formed to the front barrel 14. In other embodiments, the connector 12 is connected to the cable 11, and the front end 130 of the front barrel 14 is separate, so that the cable 11 can pass through the open front end 130 as it does through the rear end 122 of the rear barrel 16. In embodiments in which the connector 12 is fixed to the front barrel 14, a cable 11 applied to the inline housing 10 is prepared at its far end, and the internal wires or cables at the far end are electrically connected to the connector 12 and the contacts, pins, or prongs thereon, as applicable.

In operation, the inline housing 10 is useful for maintaining the posture of the cable 11. The embodiment of the housing 10 shown in FIGS. 1-4E is one in which the connector 12 is formed integrally to the front barrel 14 and so that embodiment is described first. Later, with respect to FIG. 5, the description discusses an embodiment of the housing 10 in which the connector 12 is not integral to the front barrel 14.

Attention is directed to FIGS. 4A-4E primarily. The cable 11 is applied to the inline housing 10, extends through the housing 10, and is electrically connected to the connector 12 at the front of the housing 10. The cable 11 is shown in solid line and then in broken line where hidden by the structure of the housing 10. FIG. 4A shows the inline housing 10 in a partially eroded view. The outer shell 13 is eroded so that the left half 40 is not visible. The ribs 33 of the outer shell 13 can be seen. Underneath the outer shell 13 is the intermediate shell 17: the lip 73 is shown just below the ribs 33, and the finger 75 can be seen just behind the lip 73, disposed in the forward-most channel 34. The inner shell 15 is concealed, as it is nested within the intermediate shell 17, but the collar 91 is visible, with both the outer and intermediate shells 13 and 17 confronting the confrontation surface 114 of the collar 91.

FIG. 4A defines a neutral arrangement of the housing 10. The inner shell 15 is nested within the intermediate shell 17, and the intermediate shell 17 is nested within the outer shell 13. The inner shell 15 is nested within the intermediate shell 17 because it is fully received within the inner receiving space 61 bound by the intermediate shell 17, the rear end 63 of the intermediate shell 17 is against the confrontation surface 114 of the collar 91, and the front ends 62 and 92 are generally co-located with respect to each other. The intermediate shell 17 is nested within the outer shell 13 because it is fully received within the outer receiving space 35, the rear end 22 of the outer shell 13 is against the confrontation surface 114 of the collar 91, and the front end 62 of the intermediate shell 17 is generally co-located with respect to the transition 32 of the outer shell 13.

In the neutral arrangement, the axes A and B are coaxially registered with each other. As such, the front and rear barrels 14 and 16 are coaxially registered with each other, and the bores 96 and 133 within those barrels 14 and 16 are also coaxially registered with each other. The bores 96 and 133 cooperate to define a single, straight, continuous bore through the entire inline housing 10. Thus, the cable 11 is straight through the housing 10. The cable 11, if it were not physically connected to the connector 12 and therefore also not connected to the front barrel 14, could be pulled smoothly rearwardly out of the inline housing 10 and/or slid forwardly without impediment. The mouth at the rear end 122 of the front barrel 14 is sized to snugly receive the outer diameter of the cable 11, but other than that mouth and the connector 12, the inline housing 10 does not touch the cable 11 when in the neutral arrangement. This enables full rotational movement of the cable with respect to the housing 10. In other words, when the housing 10 is in the neutral arrangement, the front barrel 14 can be rotated freely and without limitation along the double-arrowed line R (FIG. 4A) to orient the connector 12 as the user desires. Thus, when the housing 10 is in the neutral arrangement, the user will typically pick up the cable 11 near the housing 10 and rotate the front barrel 14 so that the connector 12 adopts the desired rotational orientation for easy connection of the connector 12 to an electronic component.

FIG. 4B shows the housing 10 in the neutral arrangement with the front barrel 14 rotated approximately ninety degrees with respect to the rotational orientation shown in FIG. 4A. The user rotates the front barrel 14 to ninety degrees, to one hundred eighty degrees, or to any other rotational orientation desired to make connection easier. When the housing 10 is in the neutral arrangement, full, unlimited rotation of the front barrel 14 and the connector 12 is enabled.

Often, the user will need to bend the cable 11 into a certain posture and will want the cable 11 to then maintain that posture. The housing 10 accommodates this. FIG. 4C illustrates a view eroded similarly to FIG. 4A, except that the housing 10 is now bent. To bend the housing 10 to the posture shown in FIG. 4C, the user picks up the housing 10 in his fingers, grasps the front barrel 14 with one hand and the rear barrel 16 with the other hand, and bends the rear barrel 16 down along the arcuate arrowed line P. This pivots the inner shell 15 about the common pivot axis of the post 50, thereby rearranging the front and rear barrels 14 and 16 with respect to each other about that pivot axis.

The inner shell 15 generally de-nests first, before the intermediate shell 17 de-nests from the outer shell 13. Here, "de-nests" is used to describe action or movement opposite to nesting. When a part nests, it moves within or under another part to become at least partially concealed or covered by that other part and to at least partially occupy the same space or a space within that other part. In opposition, when a part de-nests, it moves out of or away from another part to become at least partially revealed or uncovered by that other part and to at least partially occupy a different space or a space outside of that other part. As can be seen in FIG. 4C, the outer shell 13 is de-nested from the intermediate shell 17.

FIG. 4D shows the same arrangement as FIG. 4C, but the view is further eroded. In FIG. 4D, the ribs 82 of the intermediate shell 17 are visible, and the finger 110 of the outer shell 13 is also visible. Moving the housing 10 from the neutral arrangement of FIG. 4A to the posture of FIGS. 4C and 4D causes the finger 110 to snap over each rib 82 successively. The channels 84 between the ribs 82 are detents into and out of which the finger 110 snaps, each time releasably locking and unlocking the inner shell 15 from the intermediate shell 17. The finger 110 thus moves backward over each rib 82 until it is disposed behind the last rib 82. In that position, the lip 104 of the inner shell 15 confronts the rear end 63 of the intermediate shell 17, and the inner shell 15 cannot be drawn back any further without moving the intermediate shell 17. FIGS. 4C and 4D show the inner shell 15 fully de-nested, but in some cases, the user may desire to only draw that inner shell 15 partially, in which case the user only partially de-nests the inner shell 15 and the finger 110 snap-engages into one of the intermediate channels 84 indexed between the ribs 82 of the intermediate shell 17.

Regardless of whether the user partially or fully de-nests the inner shell 15 from the intermediate shell 17, the engagement of the finger 110 in the channels 84 between the ribs 82 prevents inadvertent movement along line P, thereby maintaining the posture of the housing 10. In this posture shown in FIG. 4C, the axes A and B are skewed with respect to each other. As used herein, "skew" means misaligned or non-coaxial: the axes A and B do not necessarily intersect, and they are no longer coaxially registered with each other. As such, the front and rear barrels 14 and 16 are skewed with respect to each other, and the bores 96 and 133 within those barrels 14 and 16 are also skewed with each other. The bores 96 and 133 continue to cooperate to define a single continuous bore, but that bore is no longer straight as it was in the neutral arrangement of the housing 10; instead, it is now bent, adopting the posture of the housing 10. Now, when the cable 11 is in the housing 10, it can no longer be rotated. Moving the housing 10 out of the neutral arrangement disables rotational movement of the cable 11 with respect to the housing 10. If the user attempts to rotate the cable 11 in the housing 10 when the housing 10 is in this skewed arrangement of FIG. 4C, the attempt causes the cable 11 not to rotate, but to instead bend within the housing 10 and deflect internally within the housing 10, thereby bearing against the front and rear barrels 14 and 16, as well as potentially against the shells 13, 15, and 17. When the cable 11 bears against the housing 10, the housing 10 prevents the cable 11 from rotating, thereby disabling any rotational movement. In some cases, the cable 11 simply bears against the front and rear barrels 14 and 16 and such interaction is sufficient to prevent rotational movement of the cable 11 within the housing 10.

Often the user will desire to fully de-nest the inner shell 15 from the intermediate shell 17 and will desire to de-nest the intermediate shell 17 from the outer shell 13 as well. FIG. 4E shows the housing 10 bent to an approximately ninety-degree posture, and both the inner and intermediate shells 15 and 17 are full de-nested. When the inner shell 15 fully de-nests, the lip 104 of the inner shell 15 bears against the rear end 63 of the intermediate shell 17, further movement along the arcuate arrowed line P imparts a pivoting force from the lip 104 to the rear end 63, thereby causing the intermediate shell 17 to move along the line P as well. When it does, the finger 75 of the intermediate shell 17 snap-engages over the ribs 33 of the outer shell 13 in a manner similar to that of the finger 110 snapping over the ribs 33. The channels 34 between the ribs 33 are detents into and out of which the finger 75 snaps, each time releasably locking and unlocking the intermediate shell 17 from the outer shell 13. The finger 75 thusly moves successively backward over each rib 33 until it is disposed behind the last rib 33. In that position, the lip 73 of the intermediate shell 17 confronts the rear end 22 of the outer shell 13, and the intermediate shell 17 cannot be drawn back any further.

When the inner and intermediate shells 15 and 17 are de-nested and the housing 10 is arranged out of the neutral arrangement, the outer receiving space 35 of the canopy 31 cooperates with both the inner receiving space 61 of the intermediate shell 17 and an inner space bond by the inner shell 15 to define a larger open interior 106 (as shown in FIG. 4E, there in a fully de-nested state). The cable 11 can bend in this interior 106. While a portion 11a of the cable 11 extending in the front barrel 14 is constrained and generally straight, and a portion 11b of the cable 11 extending in the rear barrel 16 is constrained and generally straight, a portion 11c of the cable 11 extending between the front and rear barrels 14 and 16 is free to deflect within the housing 10, as shown by the arrowed lines D in FIG. 4E. The cable 11 can deflect in this interior 106 to prevent overbending of the cable 11. The cable 11 can deflect inward or outward as necessary within the open interior 106 between the first and second barrels 14 and 16 without confronting the housing 10 to maintain a bend angle which does not exceed the minimum bend radius of the cable 11. In other words, the cable 11 deflects so that it does not bend more tightly than the rated minimum bend radius for the cable 11. Moreover, because the cable 11 can slide into and out of the rear barrel 16, at least, when the housing 10 moves into and out of the neutral arrangement, the cable 11 can further deflect within the interior 106, thereby avoiding the minimum bend radius and avoiding the imposition of strain which would impact reliability of the cable 11, and thus extending the effective lifespan of the cable 11.

FIG. 4E shows the intermediate shell 17 fully de-nested, but in some cases, the user may desire to only draw the intermediate shell 17 partially out, in which case the user only partially de-nests the intermediate shell 17 and the finger 75 snap-engages into one of the intermediate channels 34 indexed between the ribs 33 of the outer shell 13. Regardless of whether the user partially or fully de-nests the intermediate shell 17 from the outer shell 13, the engagement of the finger 75 in the channels 34 between the ribs 33 prevents inadvertent movement along line P, thereby maintaining the posture of the housing 10.

Regardless of whether the user partially or fully de-nests the intermediate shell 17 from the outer shell 13, the engagement of the finger 75 in the channels 34 between the ribs 33 prevents inadvertent movement along line P, thereby maintaining the posture of the housing 10. In this posture shown in FIG. 4E, as with the posture shown in FIG. 4C, the axes A and B are skewed with respect to each other. As such, the front and rear barrels 14 and 16 are skewed with respect to each other, and the bores 96 and 133 within those barrels 14 and 16 are also skewed with each other. The bores 96 and 133 continue to cooperate to define a single continuous bore, but that bore is no longer straight as it was in the neutral arrangement of the housing 10; instead, it is now bent, adopting the posture of the housing 10. Thus, when the cable 11 is in the housing 10 as in FIG. 4E, it cannot be rotated. Moving the housing 10 out of the neutral arrangement disables rotational movement of the cable 11 with respect to the housing 10. If the user attempts to rotate the cable 11 in the housing 10 when the housing 10 is in the skewed arrangement of FIG. 4E, the attempt causes the cable 11 not to rotate, but to instead bend within the housing 10 and deflect internally within the housing 10, thereby bearing against the front and rear barrels 14 and 16, as well as potentially against the shells 13, 15, and 17. When the cable 11 bears against the housing 10, the housing 10 prevents the cable 11 from rotating, thereby disabling any rotational movement. In some cases, the cable 11 bears against only the front and rear barrels 14 and 17, and such interaction is sufficient to disable rotational movement. In such cases, the cable Thus, similarly to the skewed arrangement shown in FIG. 4C, the skewed arrangement shown in FIG. 4E also disables rotational movement of the cable 11 within the housing 10. All skewed arrangements do.

The user thus first rotates the cable 11 within the housing 10 to set a desired rotational orientation of the housing 10, then bends the housing 10 to a desired skewed arrangement. When so bent, the housing 10 is locked into position and maintains the posture of the cable 11. To break that posture, the user simply bends the housing 10 back to the neutral arrangement, putting enough force on the housing 10 so that the fingers 75 and 110 overcome the snap engagements in the channels 34 and 84 and so that the intermediate shell 17 and outer shell 13 move back into their fully nested positions. This returns the housing 10 to the neutral arrangement.

Figure 5:
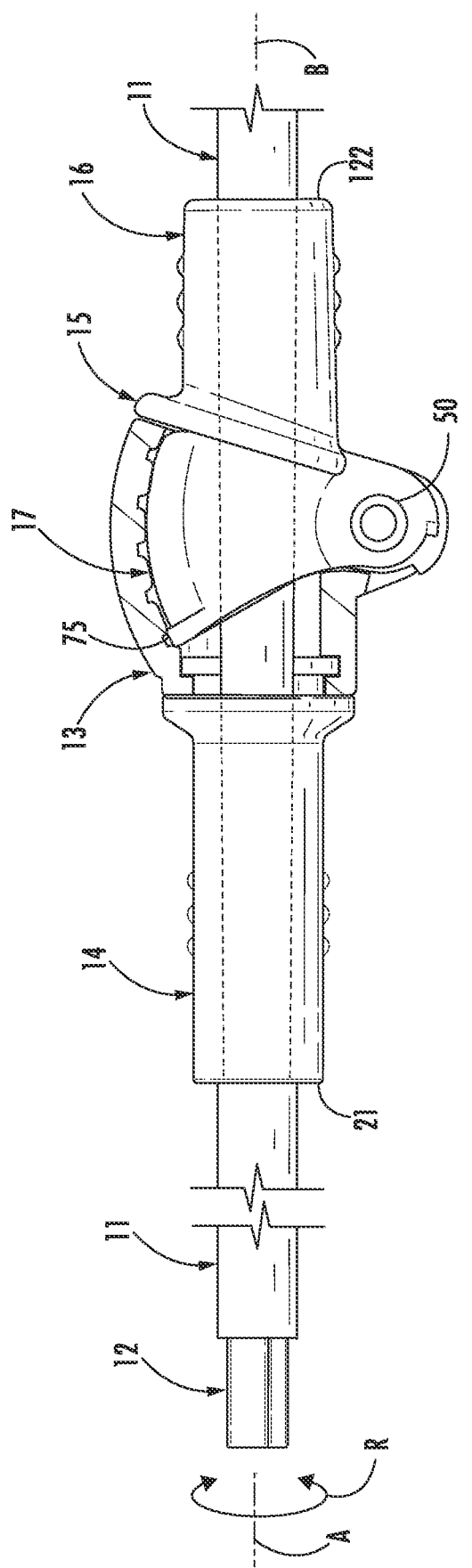
FIG. 5 is a left side view of an embodiment of an inline housing for maintaining a posture of a cable.

Turning now to FIG. 5, an embodiment of the housing 10 in which the connector 12 is not integral to the front barrel 14 is shown. Here, the housing 10 is shown separate from the connector 12, at an intermediate position on the cable 11. The housing 10 may have been manufactured separately and assembled onto the cable 11 separate from the connector 12 by the manufacturer, or the user may have added the housing 10 to an existing cable 11. Either way, the housing 10 may be close to the connector 12 or may be far from it along the length of the cable 11. Generally, the user is able to slide the housing 10 forward and backward along the length of the cable 11 to so position the housing 10 as desired. Once the user has positioned the housing 10 in the location he desires, he rotates the housing 10 with respect to the cable 11 according to the description above, and then bends the housing 10 according to the description above to set and maintain a posture of the cable 11 at that location. When done, the user bends the housing 10 back to the neutral arrangement and moves the housing 10 along the cable 11 as needed.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. An in-line housing for maintaining a cable posture, the housing comprising:
   first and second barrels including first and second bores, respectively;
   the first and second barrels are mounted for movement with respect to each other into and out of a neutral arrangement;
   when the first and second barrels are arranged in the neutral arrangement, the first and second bores are coaxially registered with each other and enable rotational movement of a cable with respect to the housing when the cable is applied to the first and second barrels; and
   when the first and second barrels are arranged out of the neutral arrangement, the first and second bores are skewed with respect to each other and disable rotational movement of the cable with respect to the housing when the cable is applied to the first and second barrels.

2. The housing of claim 1, wherein, when the housing is arranged out of the neutral arrangement, the cable applied to the first and second barrels bears against each of the first and second barrels to disable rotational movement of the cable with respect to the housing.

3. The housing of claim 1, further comprising detent elements which releasably lock the first and second barrels with respect to each other, when the first and second barrels are in and out of the neutral arrangement.

4. The housing of claim 1, wherein the first and second barrels move with respect to each other into and out of the neutral arrangement about a pivot axis.

5. The housing of claim 4, wherein the pivot axis is transverse to a first longitudinal axis of the first barrel.

6. The housing of claim 4, wherein the pivot axis is transverse to a second longitudinal axis of the second barrel.

7. The housing of claim 1, further comprising:
an outer shell mounted to the first barrel;
an inner shell mounted to the second barrel;
an intermediate shell;
when the first and second barrels are in the neutral arrangement, the intermediate shell nests within the outer shell, and the inner shell nests within the intermediate shell; and
the pivot axis is a common pivot for the inner, outer, and intermediate shells.

8. The in-line housing of claim 1, wherein the first barrel is mounted for rotation with respect to the outer shell.

9. The in-line housing of claim 1, wherein when the first and second barrels are arranged out of the neutral arrangement, and when the cable is applied to the first and second barrels, a portion of the cable applied to the first barrel is arranged at less than a ninety-degree angle with respect to another portion of the cable applied to the second barrel.

10. The in-line housing of claim 1, wherein when the first and second barrels are arranged out of the neutral arrangement and when the cable is applied to the first and second barrels, a portion of the cable extending between the first and second barrels is free to deflect within the housing so as to prevent the cable from exceeding a minimum bend radius.

11. The in-line housing of claim 1, wherein when the cable is applied to the first and second barrels, the cable is disposed within an open interior between the first and second barrels without confrontation.

12. An in-line housing for maintaining a cable posture, the housing comprising:
an outer shell, and a first barrel mounted to the outer shell;
an inner shell, and a second barrel mounted to the inner shell;
an intermediate shell disposed between the first and inner shells, wherein the first second, and intermediate shells are mounted at a common pivot axis, enabling movement of the first and second barrels into and out of a neutral arrangement;
when the first and second barrels are in the neutral arrangement, the first and second barrels are coaxially registered; and
when the first and second barrels are out of the neutral arrangement, the first and second barrels are skewed with respect to each other.

13. The in-line housing of claim 12, wherein, when the first and second barrels are in the neutral arrangement, the intermediate shell nests within the outer shell, and the inner shell nests within the intermediate shell.

14. The housing of claim 12, wherein:
when the first and second barrels are in the neutral arrangement, the first and second barrels enable rotational movement of a cable with respect to the housing when the cable is applied to the first and second barrels; and
when the first and second barrels are arranged out of the neutral arrangement, the first and second bores disable rotational movement of the cable with respect to the housing when the cable is applied to the first and second barrels.

15. The housing of claim 12, further comprising detents which releasably lock the first and second barrels with respect to each other to prevent inadvertent movement into and out of the neutral arrangement.

16. The housing of claim 12, wherein the first and second barrels move with respect to each other into and out of a neutral arrangement about the pivot axis.

17. The housing of claim 16, wherein the pivot axis is transverse to a first longitudinal axis of the first barrel.

18. The housing of claim 16, wherein the pivot axis is transverse to a second longitudinal axis of the second barrel.

19. The in-line housing of claim 12, wherein the first barrel is mounted for rotation with respect to the outer shell.

20. The in-line housing of claim 12, wherein when the first and second barrels are arranged out of the neutral arrangement, and when the cable is applied to the first and second barrels, a portion of the cable applied to the first barrel is arranged at less than a ninety-degree angle with respect to another portion of the cable applied to the second barrel.

21. The in-line housing of claim 12, wherein when the first and second barrels are arranged out of the neutral arrangement and when the cable is applied to the first and second barrels, a portion of the cable extending between the first and second barrels is free to deflect within the housing so as to prevent the cable from exceeding a minimum bend radius.

22. The in-line housing of claim 12, wherein when the cable is applied to the first and second barrels, the cable is disposed within an open interior between the first and second barrels without confrontation.

23. An in-line housing for maintaining a cable posture, the housing comprising:
an outer shell, and a first barrel mounted to the outer shell;
an inner shell, and a second barrel mounted to the inner shell;
a common pivot axis for the first and inner shells, about which the first and second barrels move into and out of a neutral arrangement;
when the first and second barrels are in the neutral arrangement, the first and second barrels are coaxially registered; and
when the first and second barrels are out of the neutral arrangement, the first and second barrels are skewed with respect to each other.

24. The housing of claim 23, further comprising detents which releasably lock the first and second barrels with respect to each other to prevent inadvertent movement into and out of the neutral arrangement.

25. The housing of claim 23, wherein the pivot axis is transverse to a first longitudinal axis of the first barrel.

26. The housing of claim 23, wherein the pivot axis is transverse to a second longitudinal axis of the second barrel.

27. The housing of claim 23, wherein:
when the first and second barrels are in the neutral arrangement, the first and second bores enable rotational movement of a cable with respect to the housing when the cable is applied to the first and second barrels; and
when the first and second barrels are arranged out of the neutral arrangement, the first and second bores disable rotational movement of the cable with respect to the housing when the cable is applied to the first and second barrels.

28. The in-line housing of claim 23, wherein, when the first and second barrels are in the neutral arrangement, the intermediate shell nests within the outer shell, and the inner shell nests within the intermediate shell.

29. The in-line housing of claim 23, wherein the first barrel is mounted for rotation with respect to the outer shell.

30. The in-line housing of claim 23, wherein when the first and second barrels are arranged out of the neutral arrangement, and when the cable is applied to the first and second barrels, a portion of the cable applied to the first barrel is arranged at less than a ninety-degree angle with respect to another portion of the cable applied to the second barrel.

31. The in-line housing of claim 23, wherein when the first and second barrels are arranged out of the neutral arrangement and when the cable is applied to the first and second barrels, a portion of the cable extending between the first and second barrels is free to deflect within the housing so as to prevent the cable from exceeding a minimum bend radius.

32. The in-line housing of claim 23, wherein when the cable is applied to the first and second barrels, the cable is disposed within an open interior between the first and second barrels without confrontation.

* * * * *